Patented Sept. 13, 1949

2,481,729

UNITED STATES PATENT OFFICE 2,481,729

PORCELAIN INSULATOR BODY

Benjamin F. Dewey, Le Roy, N. Y., assignor to Lapp Insulator Company, Inc., Le Roy, N. Y., a corporation of New York No Drawing. Application November 5, 1945, Serial No. 626,892

2 Claims. (Cl. 106—46)

This invention relates to porcelain bodies for making high frequency electrical insulators and, more particularly, to the variety of such bodies using alkaline earths as fluxes, of which steatites are the commonest.

Porcelain bodies of the above type are known to be difficult to manufacture, due to their short firing or vitrifying range in which the desirable electrical and physical properties can be attained, and this range, in the case of some compositions, is limited to a matter of one or two degrees Fahrenheit, and rarely exceeds a range of about 20°. Such limited vitrifying range is difficult to obtain and control, with the result that formed parts of porcelain bodies made of such compositions tend to warp and distort during the firing operation.

One object of the invention is to provide such a porcelain insulator body composition having an increased firing range.

Another object is to provide an improved composition of the above character adapted for making electrical insulator bodies having greater dimensional stability and less tendency to warp and distort in their formed parts during the firing operation.

A further object is to supply a composition having the above advantages, including higher resistance to thermal shock, as well as the additional advantage of being readily workable in the green state and adapted for making ceramic bodies in a wide range of sizes and shapes including bodies of relatively large size, by known and practical methods of manufacture.

To these and other ends the invention resides in certain improvements and combinations of parts, all as will be hereinafter more fully described, the novel features being pointed out in the claims at the end of the specification.

Porcelain bodies of the electrical insulator type have been made of a composition containing a major proportion of talcs, such as steatite, for example, and a minor proportion of a clay or a mixture of clays, together with a small amount of additional fluxes. Bodies made of such compositions have been difficult to manufacture due to the fact that they have had a short firing or vitrifying temperature range, limited, in the case of some compositions, to only one or two degrees Fahrenheit, and rarely exceeding a range of about 20°. Consequently, it has been difficult to precisely obtain and control the proper vitrifying temperature for a given composition, with the result that the bodies have either failed to acquire the desired electrical properties or their formed parts, due to overheating, have tended to warp and distort during the firing operation.

I have found that such difficulty may be overcome in a simple and practical way by adding to a composition of the above character, a small amount of zirconium oxide ($ZrO_2$). Such addition may be made as the oxide itself, as the silicate, or as calcium, barium or magnesium zirconium silicates. Of these I prefer barium zirconium silicate.

With the use of barium zirconium silicate, I have found for a given temperature range that the composition of such bodies can vary between 60% to 76% talc, 2% to 22% barium zirconium silicate and 10% to 26% clays. An average composition, for example, is 68% talcs, 14% barium zirconium silicate and 18% clays. These materials are blended together in the above proportions by methods familiar to the art and the pieces formed by likewise well known methods including casting, jiggering, throwing and pressing. The parts are then dried, finished, glazed if necessary and fired in a normal manner.

One or more talcs can be used and the blending of two or more talcs may be employed to determine a vitrifying temperature. I have found that such talcs as have heretofore been found unsatisfactory for the manufacture of steatites, due to their lime content, can be used to supply a substantial part of the talc when employed with a zirconium compound as described above. Examples of such talcs are as follows:

| | Typical Western Talc | Typical Eastern Talc |
|---|---|---|
| $SiO_2$ | 59.86 | 58.27 |
| $Al_2O_3$ | 1.91 | .95 |
| $Fe_2O_3$ | 1.48 | .30 |
| CaO | .10 | 6.80 |
| MgO | 30.55 | 28.48 |
| Loss | 5.54 | 5.69 |

The clay content can likewise be of one or more clays, preferably the purest clays obtainable from the standpoint of alkalis and iron. It has been found satisfactory among others, for example, to employ a clay having the following composition:

| | |
|---|---|
| $SiO_2$ | 46.95 |
| $Al_2O_3$ | 36.75 |
| $Fe_2O_3$ | .80 |
| $CaO$ | .15 |
| $MgO$ | .20 |
| $KNaO$ | .24 |
| $TiO_2$ | .18 |
| Loss | 14.95 |

Calcium zirconium silicate or magnesium zirconium silicate or mixtures thereof may be employed to replace all or a part of the barium zirconium silicate in the above described composition. Zirconium oxide or zirconium silicate, alone or in mixture with each other or with the above zirconium compounds, have been found to improve the range of vitrifying temperatures and electrical properties, but not, however, to the same extent as barium zirconium silicate. In substituting any one of these zirconium compounds, for another in the same body, it is only necessary to alter the body composition slightly so as to keep the equivalence of zirconium oxide substantially the same in all cases.

In the use of the invention, a composition may be made containing a single variety of talc, such as a New York State talc so as to have a vitrifying temperature of about 2200°, while the same composition, but substituting a Western talc, may have a vitrifying range of over 2400° F. Without the zirconium ingredient, such compositions would have a short firing range of a few degrees. The addition of the zirconium compound affects somewhat the vitrifying temperature, although to a less degree, and its addition substantially widens the vitrifying range to an extent in some cases of plus and minus 20 degrees more or less. This increased range of vitrifying temperatures is much easier to accurately attain and control and results in a substantial reduction in firing losses.

It will thus be seen that the invention accomplishes its objects and while it has been herein described by reference to the particular details of preferred compositions, it is to be understood that such disclosures are intended in an illustrative rather than a limiting sense, as it is contemplated that various modifications may be made in such compositions within the spirit of the invention and the scope of the appended claims.

I claim:

1. An electric insulator porcelain consisting essentially of the reaction products of a mixture of about 60% to about 76% talc, about 10% to about 26% clay and about 2% to about 22% of barium zirconium silicate and characterized by a relatively wide vitrifying range.

2. An electric insulator porcelain consisting essentially of the reaction products of a mixture of about 60% to about 76% talc, about 10% to about 26% clay and about 2% to about 22% of a zirconium compound selected from the group consisting of zirconium oxide, zirconium silicate, and the barium, calcium and magnesium zirconium silicates or of a mixture of said zirconium compounds and characterized by a relatively wide vitrifying range.

BENJAMIN F. DEWEY.

REFERENCES CITED

The following references are of record in the file of this patent:

UNITED STATES PATENTS

| Number | Name | Date |
|---|---|---|
| 2,308,115 | Schwartzwalder et al. | Jan. 12, 1943 |

FOREIGN PATENTS

| Number | Country | Date |
|---|---|---|
| 822,185 | France | 1937 |
| 194,260 | Switzerland | 1938 |